United States Patent [19]

Gisske et al.

[11] 4,245,148

[45] Jan. 13, 1981

[54] OPTICALLY SENSITIVE CONTROL CIRCUIT FOR A FOOD BROWNING DEVICE

[75] Inventors: Edward T. Gisske; Robert J. Sandberg, both of Verona, Wis.

[73] Assignee: Wisco Industries, Inc., Oregon, Wis.

[21] Appl. No.: 75,692

[22] Filed: Sep. 14, 1979

[51] Int. Cl.³ .............................................. H05B 1/02
[52] U.S. Cl. ................................... 219/492; 219/502; 219/519; 219/497; 219/506; 99/329 R; 99/342
[58] Field of Search ............... 219/490, 492, 493, 494, 219/497, 501, 502, 506, 509, 510, 519; 99/326, 333, 334, 329 RT, 331, 342, 329 P

[56] References Cited

U.S. PATENT DOCUMENTS

| | | | |
|---|---|---|---|
| 2,114,000 | 4/1938 | Vidaver | 99/326 |
| 2,631,523 | 3/1953 | Olving | 99/326 |
| 3,426,969 | 2/1969 | Anderson, Jr. | 219/501 |
| 3,606,151 | 9/1971 | Dumast et al. | 219/502 |
| 3,881,085 | 4/1975 | Traister | 219/501 |
| 3,944,893 | 3/1976 | Hayden | 219/492 |
| 3,956,978 | 5/1976 | Borley | 219/502 |
| 3,973,140 | 8/1976 | Phillips | 219/492 |
| 4,167,663 | 9/1979 | Granzow, Jr. | 219/502 |

Primary Examiner—Richard R. Kucia
Assistant Examiner—M. A. Paschall
Attorney, Agent, or Firm—Isaksen, Lathrop, Esch, Hart & Clark

[57] ABSTRACT

A control circuit is disclosed suitable for use with a toaster or other food browning device which utilizes a radiant energy source to brown food. A light sensitive variable resistor, or photocell, is optically coupled to light reflected from the food being browned in the device. A voltage generated by a voltage divider including the light sensitive resistor therein is compared with a preselectable voltage generated by a second voltage divider to determine whether the heat source should be turned on or off. Suitable solid state control circuitry is provided to ensure that a start-up delay is provided at the beginning of each browning cycle and to reset the circuit for future operation when the desired browning of the food is achieved.

17 Claims, 2 Drawing Figures

OPTICALLY SENSITIVE CONTROL CIRCUIT FOR A FOOD BROWNING DEVICE

BACKGROUND OF THE INVENTION

1. Field of the Invention

The present invention relates to toasters or other food browning devices in general, and, in particular, to control circuits for controlling the operation of such devices.

2. Description of the Prior Art

In the general art of controls for automatic toasters or other food browning devices it is generally conventional in the art to utilize a timing device for control of the length of browning of the food in the device. Such controls are inherently inaccurate and subject to various errors in pre-selecting the desired browness of the food to be browned inasmuch the heat emitted by the heating elements of the device may vary, thus varying the amount of browning of the food in a given time period. Such controls generally tend to be of an electrical or electro-mechanical nature and are thus subject to additional inaccuracies and variations of a significant degree as the components wear with age.

The prior art is also cognizant of at least one attempt to utilize a light sensitive circuit element in a control for an automatic toaster. For example, a control circuit for an automatic toaster is disclosed, in U.S. Pat. No. 2,436,575, which utilizes therein a photocell in conjunction with other electrical and electro-mechanical elements to form a control circuit for the toaster.

SUMMARY OF THE INVENTION

The present invention is summarized in that in a food browning device which utilizes a light generating heat source to brown food, a control circuit includes a switching device connected to control the operation of the heat source; a first resistive voltage divider including a variable resistor therein, the variable resistor being manually variable; a second resistive voltage divider including a fixed resistor and a light sensitive variable resistor, the light sensitive variable resistor being optically coupled to light reflected from the food being browned; and a voltage comparator connected to both the first and second voltage dividers and connected so as to de-energize the switching device to turn off the heat source when the voltage generated by the second voltage divider achieves a pre-selected relation relative to the voltage generated by the first voltage divider.

It is an object of the present invention to construct a control circuit for a food browning device which is dependent only upon the surface color of the food being browned by the device and is in no way dependent upon the temperature of the heat source of the device, the pre-existing condition of the food being browned, the temperature of the ambient in which the device is utilized, or the age of the device itself.

It is another object of the present invention to achieve such a result by constructing a control circuit that is directly responsive to the surface color of the food being browned.

It is yet another object of the present invention to provide a control circuit which achieves such a result and is solid-state in its construction so as to assure maximum reliability and efficiency.

Other objects, advantages, and features of the present invention will become apparent from the following specification when taken in conjunction with the accompanying drawings.

DESCRIPTION OF THE PREFERRED EMBODIMENT

Figure 1:
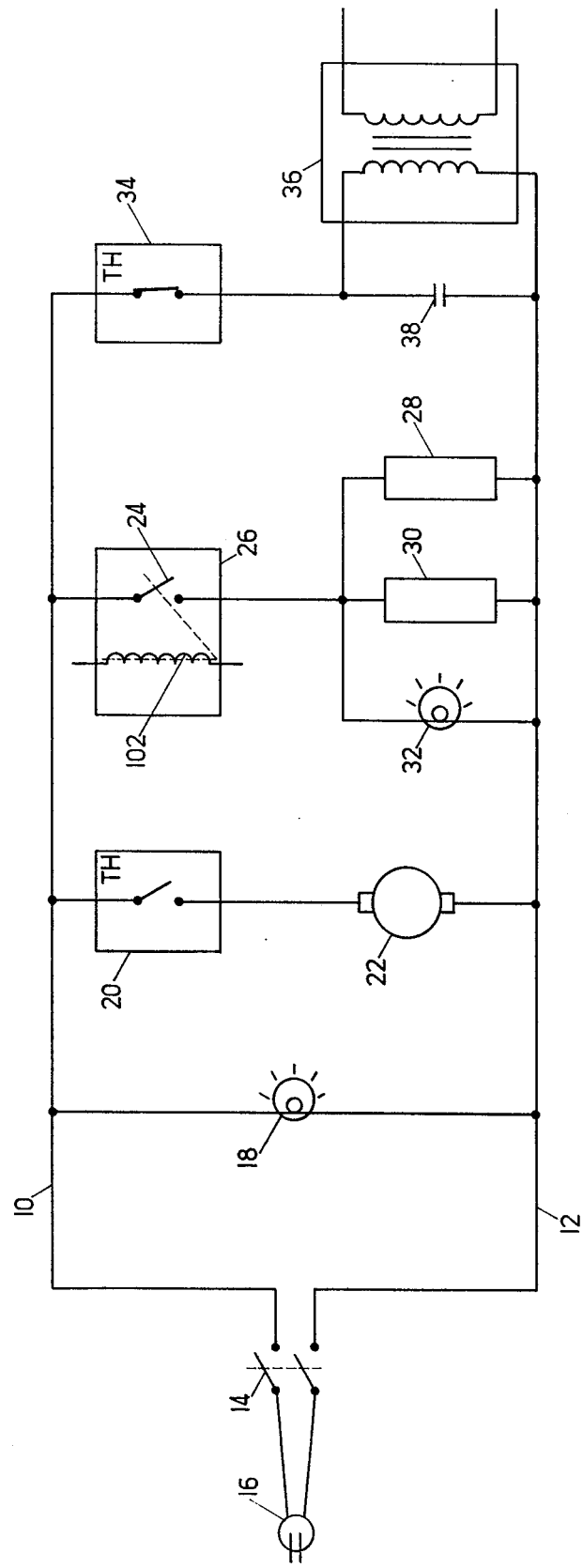
FIG. 1 is a wiring diagram of a toaster or other food browning device constructed in accordance with the present invention.
Figure 2:
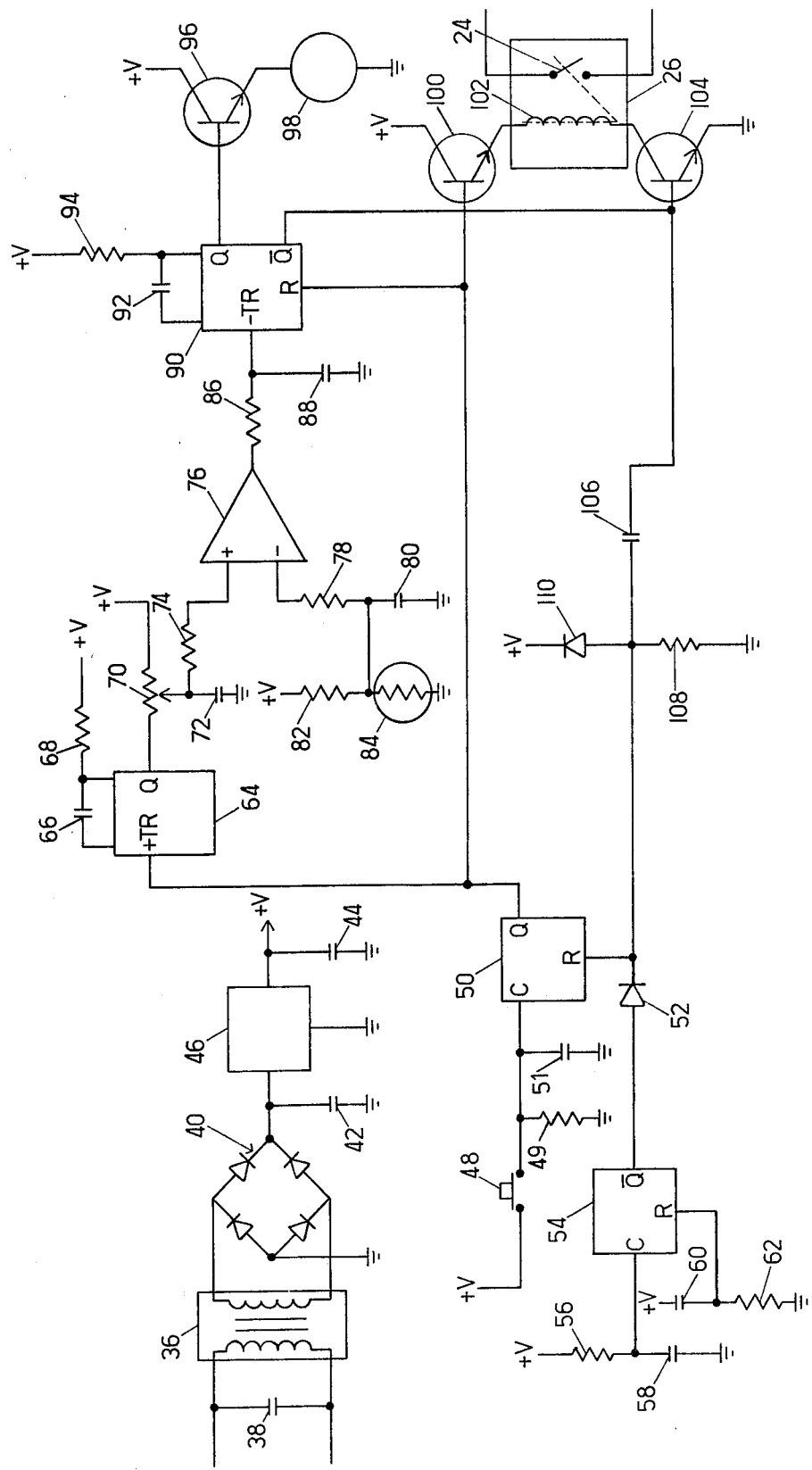
FIG. 2 is a schematic circuit diagram of a control circuit constructed in accordance with the present invention and utilized in connection with the wiring diagram circuit of FIG. 1.

Shown in FIGS. 1 and 2 are a wiring diagram and a control circuit for a food browning device such as a toaster, constructed in accordance with the present invention. As can be seen with reference to the wiring diagram of FIG. 1, a pair of AC power conductors 10 and 12 are connected through a double pole switch 14 to a utility plug 16 which may be connected to a suitable source of AC power. Connected between the AC power lines 10 and 12 is a power-on pilot light 18. Also connected in a parallel circuit between the AC power lines 10 and 12 is a series circuit of a normally-open thermal cut-out switch 20 and a fan motor 22. Wired as another parallel circuit between the power lines 10 and 12 are the output contacts 24 of a power relay 26 in series with the parallel combination of two quartz infrared lamps 28 and 30 and a operating pilot lamp 32. A last parallel circuit connected between the power lines 10 and 12 includes the series connection of a normally-closed thermal cut-out switch 34 and the primary winding of a power transformer 36. The power transformer 36 operates to supply reduced voltage power to the control circuitry shown in FIG. 2.

Referring to FIG. 2, the transformer 36 is again shown as part of a power supply circuit supplying power to the remainder of the control circuitry of FIG. 2 and has a filter capacitor 38 connected across its primary winding in order to filter transients therefrom. Connected to the secondary winding of the power transformer 36 is a full wave rectifier 40 which serves to fully rectify the waveform coming from the secondary winding of the transformer. A pair of filter capacitors 42 and 44 are each connected to ground and also connected to respective opposite terminals of an integrated voltage regulator 46 which serves to supply a 12 volt DC regulated power supply voltage to the remainder of the logic circuitry shown in FIG. 2, denoted as +V.

Of the logic circuitry shown in FIG. 2, a normally-open start-up switch 48 has one of its terminals connected to the supply voltage and the other of its terminals connected to the clock terminal of an operation-control bistable circuit or flip-flop, 50. A resistor 49 and a capacitor 51 are connected in parallel between ground and the clock terminal of the flip-flop 50 to filter out any transient "bounce" pulses generated by the start-up switch 48. Connected to the reset terminal of the flip-flop 50 is the cathode of a diode 52 which has its anode connected to the inverted output of a start-up reset bistable circuit, or flip-flop, 54. Each of the flip-flops 50 and 54 is switchable between two stables states, an "off" state and an "on" state. The flip-flop 54 has its clock terminal connected by a resistor 56 to the supply voltage and a capacitor 58 to ground. The reset terminal of the flipflop 54 is connected through a capacitor 60 to the supply voltage and a resistor 62 to ground. The time constant of the RC combinations, resistor and capacitor 56 and 58, and capacitor and resistor 60 and 62, is selected so that the combination of resistor 56 and capacitor 58 has a time constant that is much greater, such as greater by a factor of 10, than the time constant of the RC combination of the resistor 62 and the capacitor 60 for reasons that will become apparent below.

The non-inverted output of the flip-flop 50 is connected to the positive edge trigger input of a mono-stable multi-vibrator timing circuit, or one-shot, 64. A capacitor 66 and a resistor 68 are connected to the appropriate terminals of the one-shot 64 to determine the time period of the timing pulse generated by the one-shot 64. The non-inverted output of the one-shot 64 is connected to one end of a manually adjustable variable resistor, or potentiometer, 70 the other end of which is connected to the supply voltage. The wiper of the potentiometer 70 is connected to ground through a capacitor 72 and is also connected through a resistor 74 to the non-inverting input of an integrated voltage comparator circuit 76. The inverting input of the comparator 76 is connected through a resistor 78 and also through a capacitor 80 to ground. The junction of the resistor 78 and the capacitor 80 is connected to the junction of a resistor 82 connected to the supply voltage and a light-sensitive variable resistor, in the form of a cadmium sulfide photocell, 84, connected at its other end to ground. The photocell 84 may be located remotely from the remainder of the circuitry shown in FIGS. 1 and 2 and in close optical proximity to the food to be browned, or, alternatively, may be located on a common circuit board with the remainder of circuit elements of FIG. 2 and may be optically coupled to light reflected from the food being browned by a fibre optics system or similar optical transmitting means. The output of the comparator 76 is connected to an RC low-pass filter network consisting of a resistor 86 and a capacitor 88 connected to ground. The junction of the resistor 86 and the capacitor 88 is connected to the negative edge trigger input of a mono-stable multi-vibrator timing circuit, or one-shot, 90. A capacitor 92 and a resistor 94 are connected to appropriate terminals of the one-shot 90 so as to determine the time period of the timing pulse generated by the one-shot 90. The reset input terminal of the one-shot 90 is connected to the non-inverted output of the flip-flop 50. The non-inverted output of the one-shot 90 is connected to the base of an NPN switching transistor 96. The transistor 96 has its collector connected to the supply voltage and its emitter connected to an audible signal generator in the form of a beeper 98 the other end of which is connected to ground. The non-inverted output of the flip-flop 50 is also connected to the base of another NPN switching transistor 100 the collector of which is also connected to the supply voltage. The emitter of the transistor 100 is connected to one end of an input coil 102 of the power relay 26 which is operatively associated with the relay output contacts 24. The other end of the input coil 102 is connected to the collector of another NPN switching transistor 104 the emitter of which is connected to ground. While a mechanical-type relay is shown for the power relay 26, it is nevertheless possible, and in fact is preferred, that the relay 26 be a solid state relay with the input connected at 102 and the output connected at 24. The base of the transistor 104 is connected to the inverted output of the one-shot 90 and is also connected to an RC circuit including a capacitor 106, connected to ground. The junction of the capacitor 106 and resistor 108 is also connected to the anode of a diode 110 the cathode of which is connected to the supply voltage, and is also wired to the reset terminal of the flip-flop 50.

In its operation, the control circuit of FIGS. 1 and 2 operates to control a food browning device so that the device is sensitive to the actual change in color of the food being browned rather than being controlled strictly by a timing device or other non-condition responsive type of control. Referring first to FIG. 1, it can be readily seen that the plug 16 is adapted to connecting the device to the source of AC electrical power and that the switch 14 functions simply as an off/on switch for the entire circuitry. The pilot light 18 acts to give visual indication when the switch 14 is on thereby providing power to the device. The normally open thermal cut-out switch 20 acts to provide power to energize the fan motor 22 to operate a fan to blow air through the device when the device overheats beyond a predetermined level of heat, at which level the thermal cutout 20 is set. The normally closed thermal cut-out 34 is designed to provide power through the transformer 36 to the logic circuitry of FIG. 2, and is intended to open to interrupt that power when the device overheats. The output contacts 24 of the relay 26 functions to switch power on and off to the infrared lamps 28 and 30 which heat the food, and the operating pilot light 32 functions to provide a visual indication on the exterior of the device when the heating lamps 28 and 30 are being operated.

In generally characterizing the circuit components of the control circuitry of FIG. 2, the transformer 36 and the integrated voltage regulator 46 and allied components function as a regulated power supply to the remainder of the circuitry of FIG. 2. The flip-flop 50 functions as an off/on device to control the operation of the remainder of the circuitry. The flip-flop 54 functions as a start-up reset to reset the circuitry in general by resetting the flip-flop 50 when the circuit is turned on to insure that operation begins in the proper sequence. The one-shot 64 functions as the timing device to provide a timing pulse at the beginning of the operation of the circuitry for a start-up delay in sensing the condition of the food. The potentiometer 70 functions as a manually adjustable voltage divider while the combination of the resistor 82 and the photocell 84 functions as a second, light-responsive, voltage divider. The voltages of the two voltage dividers are compared by the voltage comparator 76. The one-shot 90 functions as a timing circuit to provide a timing device to terminate the operation of the circuitry of FIG. 2. The transistor 96 and beeper 98 function as an audible alarm to indicate the termination of the operation of the device. The relay 26 in conjunction with the transistors 100 and 104 function as a switching device to control the operation of the heat lamps 28 and 30 in accordance with the state of the control circuitry in the rest of FIG. 2.

In order to initiate the operation of the circuitry of FIG. 2, a user whould first press the start-up switch 48. The depressing of the switch 48 causes the supply voltage to be impressed upon the clock terminal of the flip-flop 50. The flip-flop 50 normally rests in its off state and so the raising of its clock terminal to a high state causes the flip-flop 50 to switch on. This on state is manifested by a high at the non-inverted output of the flip-flop 50, and this high level starts the circuitry of FIG. 2 in operation. This level is applied to the base of the transistor 100 thereby causing the transistor 100 to switch on causing current to flow through the coil 102 of the relay 26 through the transistor 104, which is normally on, to ground. This current flowing through the relay input coil 102 causes the output contacts 24 of the relay 26 to close thereby providing power to the quartz heat lamps 28 and 30 thereby causing heat to be applied to the food in the device. Simultaneously, the turning on of the flip-flop 50 causes a positive edge to be applied to the trigger input of the one-shot 64 thereby triggering the one-shot 64 to generate a timing pulse. The output timing pulse of the one shot 64 functions as a warmup delay to insure the operation of the circuitry of FIG. 2 for a minimum period of time regardless of the condition of the food placed within the browning device and to allow transient voltages to settle out of the circuit before the condition of the food is sensed. Thus the non-inverted output of the one-shot 64, which normally rests in a low state, is momentarily raised to a high state, thereby raising both ends of the potentiometer 70 to a high state and thus insuring that the non-inverting input to the comparator 76 is initially high. At the expiration of the timing pulse of the one-shot 64, the non-inverting output of the one-shot 64 returns low thereby applying a level of ground to the one side of the potentiometer 70 to cause the the potentiometer 70 to generate a voltage divided from the supply voltage, with that voltage being applied to the inverting input of the comparator 76. The comparator 76 functions to compare the voltages at its non-inverting and inverting inputs with the output of the comparator 76 being high if the voltage at the non-inverting input is higher, and being low if the voltage at the inverting input is higher. The voltage at the non-inverting input is determined by the potentiometer 70 which functions as a manually adjustable voltage divider. This voltage divider is adjustable by means of the manual adjustment of the wiper along the potentiometer 70 so that any desired voltage between ground and the supply voltage may be applied to the non-inverting input of the voltage comparator 76. Meanwhile, the inverting input of the voltage comparator 76 is connected through the resistor 78 to a voltage divider made up of the fixed resistor 82 and the variable light-sensitive resistor, or photocell, 84. Inasmuch as the photocell 84 is optically connected to light reflected from the food in the browning device, the resistance of the photocell slowly rises as the food within the browning device slowly becomes more browned and thus reflects less light. At some level, with the level being determined by the setting of the potentiometer 70, the output of the voltage divider consisting of the resistors 82 and 84 surpasses the voltage generated by the potentiometer 70, and the output of the voltage comparator 76 goes low. This voltage is transmitted to the negative edge trigger input of the one-shot 90. The resistor 86 and capacitor 88 connected between the voltage comparator 76 and the one-shot 90 function together as a low-pass filter to ensure that no transients or noice pulses may be transmitted by the comparator 76 to falsely trigger the one-shot 90. When the one-shot 90 is triggered, the inverted output of the one-shot, which is normally resting in a high state, goes low, thereby turning off the transistor 104. When the transistor 104 is turned off, the current flow through the relay coil 102 is obstructed, and the relay 26 is turned off thereby removing power from the heat lamps 28 and 30. The operation of the one-shot 90 also functions to turn on the transistor 96 to cause current to flow therethrough to operate the beeper 98. The beeper 98 generates an audible alarm indicating to the operator of the food browning device that the food within the device has been browned to the desired degree. The operation of the one-shot 90 also serves, through the inverted output thereof, to generate a timing pulse through the RC circuit consisting of the capacitor 106 and resistor 108. This RC circuit functions to generate a positive going pulse at the termination of the timing pulse generated by the one-shot 90. This positive going pulse functions to reset the flip-flop 50 to its off state to terminate operation of the circuitry of FIG. 2. The output of the flip-flop 50 is also connected to the reset of the one-shot 90 to ensure that the one-shot 90 does not erroneously operate at any time except when the food is being browned.

The flip-flop 54 functions as a start-up reset circuit to reset the flip-flop 50 when power is turned on to the circuitry of FIG. 2. When the power is turned on to the circuit, the flip-flop 54 is first reset to an off state by the RC combination of resistor 60 and capacitor 62 which briefly holds a high voltage at the reset terminal of the flip-flop 54 before allowing that voltage to rapidly decay to a low level. Sometime thereafter, the RC combination of resistor 56 and capacitor 58 begins to generate a voltage which starts low and begins to rise to a high voltage. Since the time constant of the RC combination of resistor 56 and capacitor 58 is much longer than that of resistor 62 and capacitor 60, the rise of the voltage level at the clock terminal of the flip-flop 54 occurs some time after the flip-flop 54 was reset. This rising voltage level clocks the flip-flop 54 on, thus lowering the output at its inverted output. Thus the inverted output of the flip-flop 54 starts high during a power-up sequence, and then goes low, and it thereby resets the flip-flop 50 to put the flip-flop 50, and thereby the entire circuitry of FIG. 2, in proper condition for operation.

The circuitry of FIGS. 1 and 2 offers several advantages over prior art type control devices for browning food. Firstly, the circuitry is directly responsible to the color of the food being browned, and thus is independent of the time necessary to cook that particular food and is also independent of the exact amount of heat generated by the heating device being used. Furthermore, this advantage is achieved in solid-state circuitry which has inherent reliability and efficiency in its operation as well as low cost. The use of a comparator such as the voltage comparator 76, allows direct comparison between a manually adjustable voltage created by the potentiometer 70 and a second voltage directly responsive to the light reflected from the food, as generated by the photocell 84, to thus ensure that the control is directly responsive both to user selectable setting and to the condition of the food. The circuitry further provides, through the beeper 98, an audible alarm indicating the termination of the browning cycle. The device can operate over a wide range of pre-selectable levels of browning and is utilizable with a wide variety of heat sources, as long as the heat source generates some suitable spectrum of light in its operation so that the light can be reflected from the food to the photocell 84. This circuitry should also be long-lived and not subject to alteration in its operating characteristic as it ages.

It is envisioned that this control circuit of FIGS. 1 and 2 is utilizable in a wide variety of food browning devices. While this circuitry is particularly adapted for use in a toaster in which bread is toasted to a desired degree, it may also be utilized in any of a wide variety of browning ovens, toasters, or grills in which food is darkened in color as it is cooked. Since the range of darkness of the food is completely adjustable over a wide range, even relatively dark food may be cooked in a device controlled by such a circuit as long as the food darkens to some degree as it is cooked.

It is understood that the present invention is not limited to the particular construction and arrangement of parts disclosed and illustrated herein, but embraces all such modified forms thereof as come within the scope of the following claims.

We claim:

1. In a food browning device which utilizes a light generating heat source to brown food, the control circuit comprising:

a switching device connected to control the operation of the heat source;

a first resistive voltage divider including a variable resistor therein, the variable resistor being manually variable;

a second resistive voltage divider including a fixed resistor and a light sensitive variable resistor, the light sensitive variable resistor being optically coupled to light reflected from the food being browned;

a voltage comparator connected to both the first and second voltage dividers and connected so as to de-energize the switching device to turn off the heat source when the voltage generated by the second voltage divider achieves a pre-selected relation relative to the voltage generated by the first voltage divider;

a bistable circuit switchable between on and off states connected to the switching device so as to prevent operation of the switching device when the bistable circuit is in its off state, the switching of the bistable circuit to its on state initiating operation of the switching device;

a timing circuit connected to the output of the voltage divider, the timing circuit creating a timing pulse, the timing circuit connected to the switching device so as to prevent operation of the switching device during the timing pulse and also connected to the bistable circuit to switch the bistable circuit to its off state at the end of the timing pulse; and a manually operable start-up switch connected to the bistable circuit so as to be capable of switching the bistable circuit from its off state to its on state to initiate operation of the switching device, the operation of the control circuit thereafter being unaffected by the operation of the start-up switch.

2. In a food browning device which utilizes a light generating heat source to brown food, the control circuit comprising:

a switching device connected to control the operation of the heat source;

a first resistive voltage divider including a variable resistor therein, the variable resistor being a manually variable potentiometer having one of its ends connected to the supply voltage;

a second resistive voltage divider including a fixed resistor and a light sensitive variable resistor, the light sensitive variable resistor being optically coupled to light reflected from the food being browned;

a voltage comparator connected to both the first and second voltage dividers and connected so as to de-energize the switching device to turn off the heat source when the voltage generated by the second voltage divider achieves a pre-selected relation relative to the voltage generated by the first voltage divider; and a timing circuit having its output connected to the other end of the potentiometer of the first voltage divider, the timing circuit being triggered simultaneously with the initial operation of the switching device, the timing circuit functioning to raise the other end of the potentiometer to a high voltage for a predetermined amount of time at the beginning of the browning cycle to insure that the comparator does not inhibit operation of the switching device during the warm-up of the heat source.

3. In a food browning device, the control circuit as claimed in claim 2 wherein a bistable circuit controls the operation of the switching device and the timing circuit, the bistable circuit being switchable between off and on states, and the switching of the bistable circuit to its on state triggering the operation of the timing circuit.

4. In a food browning device, the control circuit as claimed in claim 3 wherein a manually operable start-up switch is connected to switch on the bistable circuit so that operation of the control circuit may be initiated.

5. In a food browning device, the control circuit as claimed in claim 2 wherein a second timing circuit is connected to the output of the voltage comparator, and wherein an audible alarm is connected to the output of the second timing circuit so that an audible alarm is generated for a fixed period of time at the termination of the browning of the food in the browning device.

6. In a food browning device, the control circuit as claimed in claim 5, wherein a low-pass filter is connected between the output of the voltage comparator and the second timing circuit to prevent erroneous operation of the second timing circuit due to any transient voltage levels which may arise.

7. In a food browning device, the control circuit as claimed in claim 2 wherein the switching device includes a relay having a primary coil and second contacts, the secondary contacts connected to control operation of the heat source, and wherein the switching device further includes a pair of transistors connected in series with the primary coil of the relay so as to control the operation thereof.

8. In a food browning device, the control circuit as claimed in claim 7 wherein a first bistable circuit switchable between off and on states controls the operation of the switching device by having its output connected to one of the transistors connected in series with the primary coil of the relay.

9. In a food browning device, the control circuit as claimed in claim 8 wherein a second start-up bistable circuit is provided which is connected to generate a pulse when power is initially supplied to the circuit, the second bistable circuit being connected to the first bistable circuit so as to reset the first bistable circuit to its off state when power is initially supplied to the circuitry.

10. In a food browning device, the control circuit as claimed in claim 9 wherein a pair of circuits including a resistor and a capacitor in series are connected to the clock and reset terminals of the second bistable circuit respectively so as to insure that the second bistable circuit generates an appropriate level when power is supplied to the circuit so as to reset the first bistable circuit.

11. In a food browning device, the control circuit as claimed in claim 2 wherein the heat source includes at least one heat lamp.

12. In a food browning device which utilizes a light generating heat source to brown food, the control circuit comprising:
- a switching device connected to control operation of the heat source, the switching device including a pair of transistors in series therewith connected so that either transistor can inhibit operation of the heat source by the switching device;
- a bistable circuit switchable between on and off states connected to a first of the transistors in the switching device so as to switch off the switching device when the bistable circuit is in its off state;
- a manually variable resistor;
- a light sensitive variable resistor optically coupled to light reflected from the food being browned;
- a voltage comparator connected so as to compare the relative resistances of the manually variable resistor and the light sensitive variable resistor to create an output signal when a pre-selected relation therebetween is reached;
- a timing circuit connected to the output of the voltage comparator, the timing circuit creating a timing pulse, the timing circuit connected to a second of the transistors in the switching device so as to switch off the switching device during the period of the timing pulse so that the heat source does not operate during the timing pulse and also connected to the bistable circuit to switch the bistable circuit off at the end of the timing pulse; and
- an audible signal generator connected to the output of the timing circuit so as to generate an audible signal during the timing pulse to thereby signal that the food is browned to the desired level.

13. In a food browning device, the control circuit as claimed in claim 12 wherein the audible signal generator includes a transistor connected in series with a beeper, the transistor being controlled by the output of the timing circuit and in turn controlling the operation of the beeper to turn on the beeper when the timing pulse is generated by the timing circuit.

14. In a food browning device, the control circuit as claimed in claim 12 wherein a low-pass filter is connected between the voltage comparator and the timing circuit to insure that noise and transient voltages do not trigger the timing circuit.

15. In a food browning device, the control circuit as claimed in claim 12 wherein the switching device includes a relay having an input and a pair of output contacts connected in series with the heat source, the pair of transistors connected in series with the input of the relay.

16. In a food browning device, the control circuit as claimed in claim 12 wherein a capacitor and resistor are connected between the output of the timing circuit and a reset terminal of the bistable circuit to switch the bistable circuit to its off state upon the termination of the timing pulse generated by the timing circuit.

17. In a food browning device, the control circuit as claimed in claim 12 wherein the heat source includes at least one heat lamp.

* * * * *